(12) United States Patent
Sawa

(10) Patent No.: US 8,421,669 B2
(45) Date of Patent: Apr. 16, 2013

(54) SYNTHETIC APERTURE PROCESSING SYSTEM AND SYNTHETC APERTURE PROCESSING METHOD

(75) Inventor: Takao Sawa, Yokosuka (JP)

(73) Assignee: Japan Agency for Marine-Earth Science and Technology, Yokosuka-shi, Kanagawa (JP)

( * ) Notice: Subject to any disclaimer, the term of this patent is extended or adjusted under 35 U.S.C. 154(b) by 219 days.

(21) Appl. No.: 12/920,195

(22) PCT Filed: Mar. 7, 2008

(86) PCT No.: PCT/JP2008/054165
§ 371 (c)(1),
(2), (4) Date: Oct. 18, 2010

(87) PCT Pub. No.: WO2009/110096
PCT Pub. Date: Sep. 11, 2009

(65) Prior Publication Data
US 2011/0032142 A1 Feb. 10, 2011

(51) Int. Cl.
*G01S 13/00* (2006.01)
(52) U.S. Cl.
USPC ........... 342/25 R; 342/128; 342/132; 342/136
(58) Field of Classification Search ................... 342/26, 342/128, 132, 136
See application file for complete search history.

(56) References Cited

U.S. PATENT DOCUMENTS 5,530,447 A * 6/1996 Henderson et al. ............. 342/70

FOREIGN PATENT DOCUMENTS

| JP | 09-281299 A | 10/1997 |
|---|---|---|
| JP | 2002-311136 | 10/2002 |
| JP | 2003-028955 | 1/2003 |
| JP | 2003-161779 | 6/2003 |
| JP | 2003-222678 | 8/2003 |

OTHER PUBLICATIONS

Kazuo Ouchi, "Principles of Synthetic Aperture Radar for Remote Sensing", Tokyo Denki University Press, Jan. 20, 2004, p.151-p.176, and English translation.

* cited by examiner

*Primary Examiner* — Timothy A Brainard
(74) *Attorney, Agent, or Firm* — Drinker Biddle & Reath LLP

(57) ABSTRACT

A synthetic aperture processing system that includes a signal transmission unit for generating and radiating a plurality of chirp waves to an irradiation region from measuring sites, a signal reception unit for receiving a plurality of reflected waves caused by the plurality of chirp waves, a range compression unit for range-compressing each of the reflected waves and generating reception data consisting of sinc functions, a cross-correlation computation unit for, based on a plurality of model data segments, calculating correlation values representing a degree of correlation between each of the model data segments and the reception data, and image output unit for outputting the correlation values calculated by cross-correlation computation unit.

6 Claims, 13 Drawing Sheets

SYNTHETIC APERTURE PROCESSING SYSTEM AND SYNTHETC APERTURE PROCESSING METHOD

TECHNICAL FIELD

The present invention relates to a synthetic aperture processing system and a synthetic aperture processing method in, for example, radars and sonars.

BACKGROUND ART

Sonars and radars can explore distant targets in wide ranges. Unfortunately, they have low resolutions along the travel line (azimuth direction) of platforms with the sonars and radars in the exploration of distant targets. A synthetic aperture processing method is known for overcoming such a disadvantage in which a virtual extension of a short receiving array of a readily manageable size enhances the azimuth resolution.

In the synthetic aperture processing, while moving at a constant speed, the platform repeatedly radiates periodic pulses toward the ground or sea surface to receive a plurality of reflected waves. Subsequently, processing of these refection waves creates sonar images or radar images with improved resolutions in both the range direction (direction of the pulse-irradiated ground or sea surface) and the azimuth direction.

Known synthetic aperture processing methods are one-dimensional algorithm and two-dimensional algorithm (see, for examples, Non-patent literature 1). In the one-dimensional algorithm, the reflected waves are pulse-compressed in the time direction (referred to as range compression) based on a conventional pulse compression technique. Subsequently, the recorded time lag of the reflected waves, called range coverture, which is caused by the movement of the platform, is corrected. Waveform amplitudes of the reflected waves are then accumulated to output a sonar image or radar image with improved resolutions in both the range and azimuth directions.

In the two-dimensional algorithm, a plurality of the reflected waves are two-dimensionally correlated with reference signals that are produced based on ideal reception waves reflected from a plurality of predetermined sites within the coverage, and correlation values are calculated for these predetermined sites within the coverage. Based on the correlation values, a sonar or radar image with improved resolutions in both the range and azimuth directions is produced.

Non-patent Literature 1: Kazuo Ouchi, "Rimoto Sensingu no tameno Gousei Kaikoh Rehdah no Kiso (Basic Synthetic Aperture Radar for Remote Sensing)", Tokyo Denki University Press, 2004

SUMMARY OF INVENTION

Technical Problem

In order to maintain usefulness of a radar or sonar that involves a synthetic aperture process, it is desirable to obtain a radar image or sonar image in real time; therefore, it is desired that the load of calculation on a computer for the synthetic aperture process be reduced.

In the conventional one-dimensional algorithm, although the load of calculation in the azimuth direction is small because of its simple summation, a large error may occur depending on conditions because the range coverture correction requires data interpolation for the reflected waves.

Furthermore, the two-dimensional algorithm, which carries out two-dimensional correlation of the reflected waves without modification with reference signals, can perform the synthetic aperture process at high precision; however, the process requires calculation of an enormous number of reference signals for the correlation, resulting in high calculation load.

Accordingly, for solving the problem described above, an object of the present invention is to provide a synthetic aperture processing system and a synthetic aperture processing method that can perform synthetic aperture processing at high precision with low computation load.

Solution to Problem

For solving the problem described above, a synthetic aperture processing system of the present invention includes transmission means for generating a frequency-modulated wave having a time-varying frequency and radiating the frequency-modulated wave to an irradiation region from a plurality of measuring sites; reception means for receiving a plurality of reflected waves caused by the frequency-modulated waves radiated from the transmission means; range compression means for range-compressing each of the reflected waves received by the reception means and generating reception data consisting of a plurality of sinc functions; correlation value calculation means for, based on a plurality of model data segments consisting of a plurality of sinc functions obtained by range compression of ideal reception waves caused by the reflection of the frequency-modulated waves at a plurality of predetermined sites in the irradiation region and the reception data generated by the range compression means, calculating correlation values representing a degree of correlation between each of the model data segments and the reception data; and output means for outputting the correlation values calculated by the correlation value calculation means.

Alternatively, for solving the problem described above, a synthetic aperture processing method of the present invention includes a transmission step of generating a frequency-modulated wave having a time-varying frequency and radiating the frequency-modulated wave to an irradiation region from a plurality of measuring sites; a reception step of receiving a plurality of reflected waves caused by the plurality of frequency-modulated waves radiated from the transmission step; a range compression step of range-compressing each of the reflected waves received by the reception step and generating reception data consisting of a plurality of sinc functions; a correlation value calculation step of, based on a plurality of model data segments consisting of a plurality of sinc functions obtained by range-compression of ideal reception waves caused by the reflection of the frequency-modulated waves at a plurality of predetermined sites in the irradiation region and the reception data generated by the range compression step, calculating correlation values representing a degree of correlation between each of the model data segments and the reception data; and an output step of outputting the correlation values calculated by the correlation value calculation step.

These configurations performs the range-compression to calculate the correlation values using reception data consisting of sinc functions having a smaller number of data segments than the reflected waves, resulting in a reduction in computation load. Furthermore, like the conventional two dimensional algorithm, the calculation of the correlation values between the reception data and the model data allows the range coverture modification of the conventional one-dimensional algorithm to be unnecessary, resulting in avoidance of the large error. The correlation value represents a reliability measure indicative of whether or not frequency-modulated waves are actually reflected at the plurality of predetermined sites in the irradiation region for the frequency-modulated wave, and, for example, a large correlation value between a model data segment and a sample data segment indicates a high probability that an object is actually present in the predetermined site corresponding to the model data segment, and that the frequency-modulated wave has been reflected in this site.

Furthermore, the synthetic aperture processing system of the present invention preferably further includes model data calculation means for calculating the model data segment used for the correlation value calculation means, for each of the plurality of predetermined sites in the irradiation region in accordance with the frequency-modulated wave generated by the transmission means.

This configuration generates model data segments in accordance with the frequency-modulated waves in actual use, allowing the synthetic aperture process to be surely implemented.

Furthermore, in the synthetic aperture processing system of the present invention, the model data calculation means extracts data sets at two points having a predetermined distance on both sides of the peak from each sinc function constituting a model data segment to calculate the model data segment using these extracted data sets, and preferably the correlation value calculation means further includes selection means for selecting, for each of a plurality of model data segments calculated by the model data calculation means, data sets at two data points from the sinc functions constituting reception data as sample data in accordance with the position information of data sets at the two points, and cross-correlation computation means for performing the cross-correlation computation between sample data of reception data selected by the selection means and the data sets of the plurality of model data segments to calculate the correlation values.

This configuration extracts sample data from reception data to calculate cross-correlation values, resulting in less data for calculating correlation values and, therefore, less calculation load.

Furthermore, in the synthetic aperture processing system of the present invention, the model data calculation mean extracts data sets at two points having a predetermined distance on both sides of the peak from each sinc function constituting a model data segment to calculate the model data segment using these extracted data sets, and preferably the correlation value calculation means further includes selection means for selecting, for each of a plurality of model data segments calculated by the model data calculation means, data sets at two points from sinc functions constituting reception data as sample data in accordance with the position information of data sets at the two points, and summation calculation means for calculating the correlation values by summation calculation of sample data of reception data selected by the selection means.

This configuration extracts sample data from reception data to calculate correlation values, resulting in further less data to be required for calculating correlation values. In addition, after the extraction of the sample data, even summation calculation of these data alone can calculate the correlation values, thus resulting in further less calculation load. Herein, a "data segment" refers to a piece of data and a "data set" refers to a group of pieces of data.

Advantageous Effect of Invention

In accordance with the synthetic aperture processing system and the synthetic aperture processing method of the present invention, synthetic aperture processing can be performed at high precision with low computation load.

Figure 1:
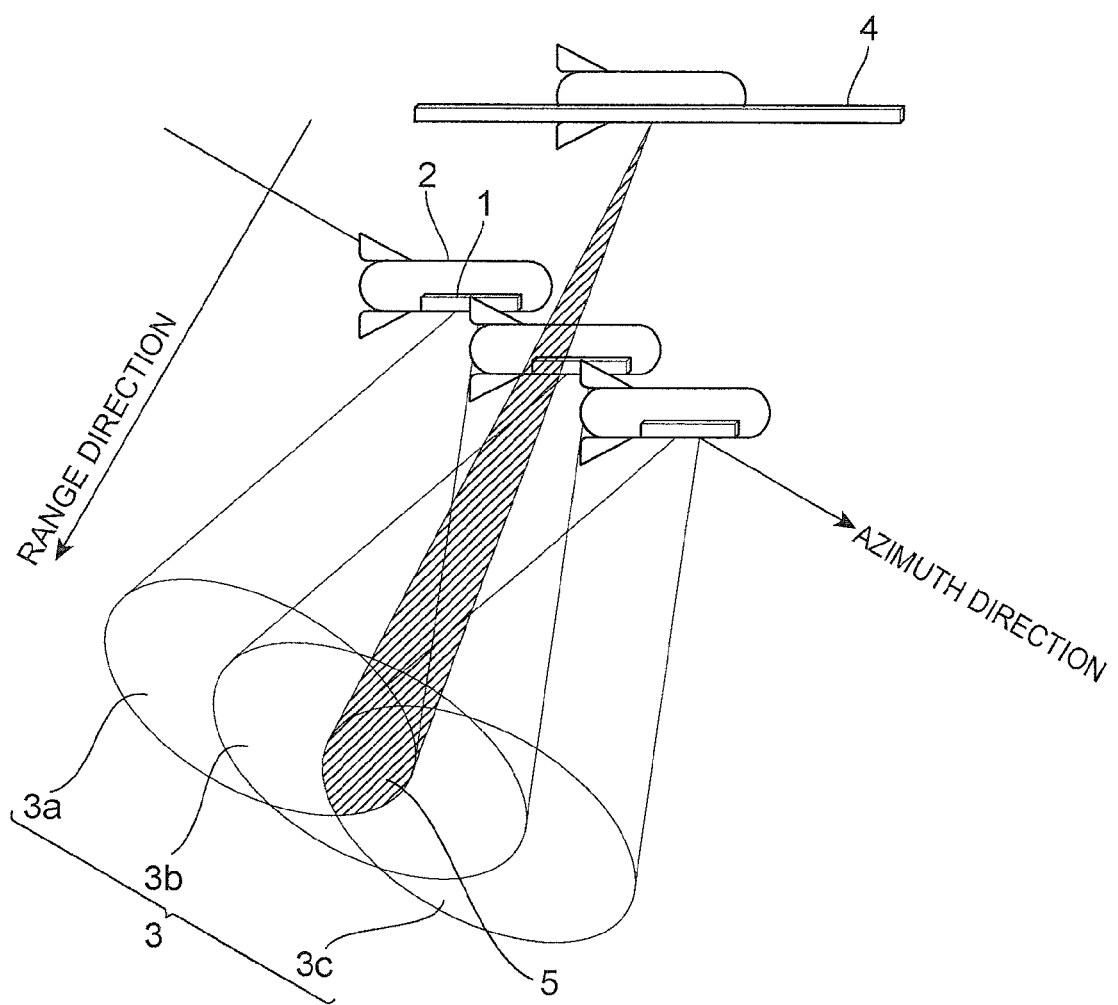
FIG. 1 is a schematic view illustrating a synthetic aperture sonar.

REFERENCE SIGNS LIST 10, 20, 30 synthetic aperture processing system
11 measurement parameter input unit
12 signal transmission unit
13 antenna
14 signal reception unit
15 range compression unit
16 model data calculation unit
17 sample data selection unit
18, 28 cross-correlation computation unit
19 Image output unit
26 model data calculation unit
38 summation computation unit

BEST MODE FOR CARRYING OUT THE INVENTION

The preferred embodiments of a synthetic aperture processing system and a synthetic aperture processing method in accordance with the present invention will now be described in detail with reference to the drawings. Identical reference numerals are used to designate identical elements that are common throughout the drawings and explanations thereof are omitted.

(Overview of Synthetic Aperture Sonar)

With reference to FIG. 1, the overview of a synthetic aperture sonar (SAS) applied to the synthetic aperture processing system in accordance with the present invention is now described.

A conventional sonar 1 is mounted on a platform 2, for example, a ship or a submarine. While the platform 2 travels in one direction, it radiates pulsed acoustic waves to an irradiation region 3, such as a seafloor surface. Then, the intensities of the reflected waves with elapsed times (seconds) are measured to generate a sonar image and detect an object located in the radiation direction of the pulsed acoustic waves (range direction). The pulsed acoustic waves mainly used are chirp pulses (chirp waves), which are frequency-modulated waves. A known pulse compression technique is applied to the measured reflected waves to enhance the resolution of the sonar images in the range direction.

In a synthetic aperture sonar 4, at multiple positions along the travel line (azimuth direction) of the platform 2, a plurality of reflected waves received by the conventional sonar 1 is synthetically processed to virtually extend the receiving array of the sonar 1 in the azimuth direction. Consequently, as shown in FIG. 1, the synthetic aperture sonar 4 is equivalent to a conventional sonar 1 having a larger antenna, and thus, can enhance the resolution of the azimuth direction in the common area 5 of a plurality of regions $3a$ to $3c$ in the azimuth direction irradiated by the conventional sonar 1.

The synthetic aperture processing system in accordance with the present invention refers to the synthetic aperture sonar 4 illustrated in FIG. 1. Furthermore, the "azimuth direction" used in the description below refers to the travel line of the platform 2 as illustrated in FIG. 1. The "range direction" refers to a direction which is perpendicular to the azimuth direction and to which pulsed acoustic waves are radiated from the platform 2.

First Embodiment

Figure 2:
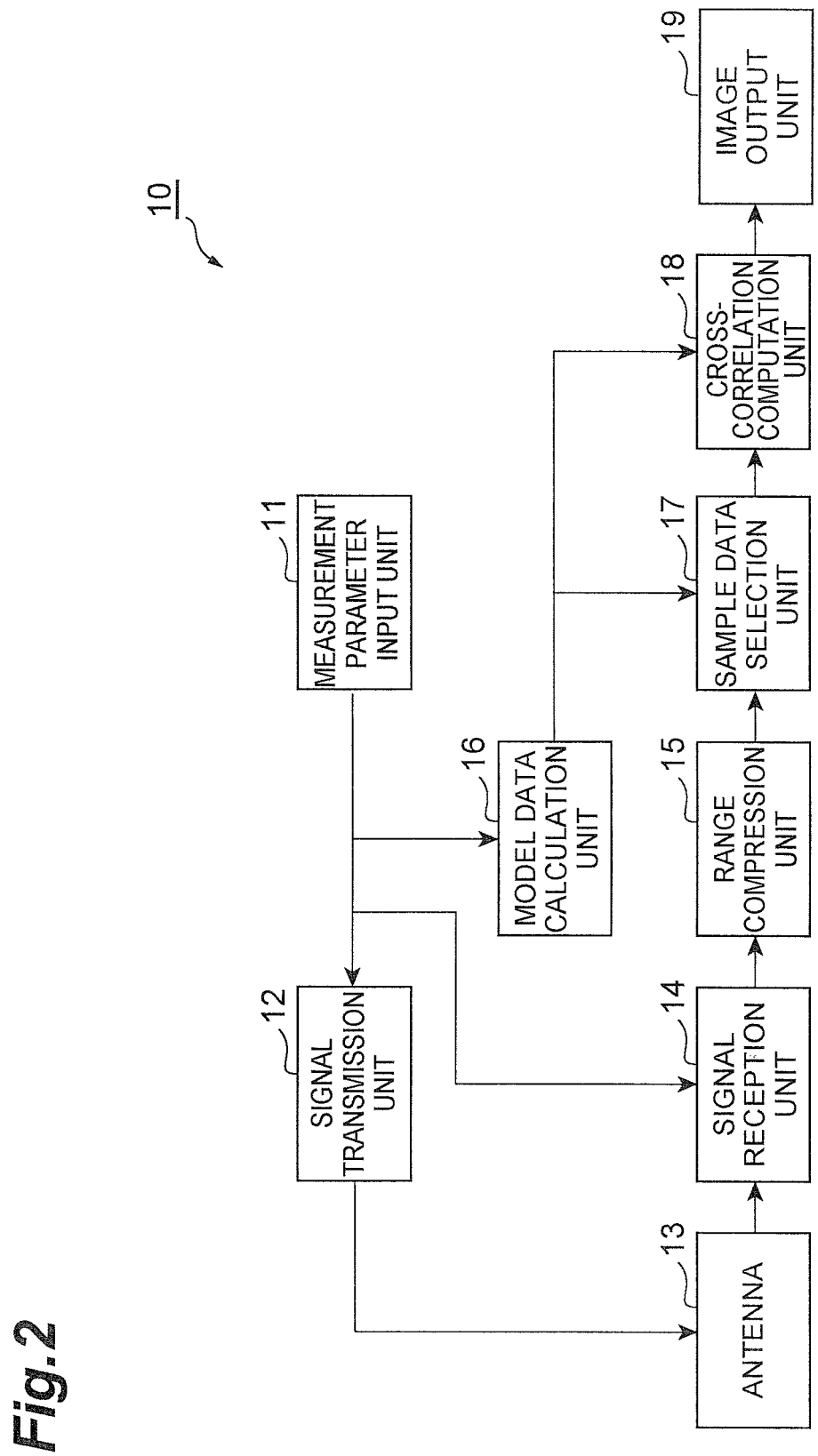
FIG. 2 illustrates a configuration of a synthetic aperture processing system in accordance with a first embodiment of the present invention.

A first embodiment of the synthetic aperture processing system in accordance with the present invention is described below. FIG. 2 illustrates the configuration of the synthetic aperture processing system in accordance with the first embodiment of the present invention. As illustrated in FIG. 2, the synthetic aperture processing system 10 of the present embodiment includes a measurement parameter input unit 11, a signal transmission unit (transmission means) 12, an antenna (transmission means and reception means) 13, a signal reception unit (reception means) 14, range compression unit (range compression means) 15, a model data calculation unit (model data calculation means) 16, a sample data selection unit (correlation value calculation means and selection means) 17, a cross-correlation computation unit (correlation value calculation means and cross-correlation computation means) 18, an image output unit (output means) 19.

The components other than the antenna 13 of the synthetic aperture processing system 10 are physically configured as a computer system connected to the antenna 13. The computer system includes primary storage devices, for example, a CPU (central processing unit), a RAM (random access memory), and a ROM (read only memory), an auxiliary storage device such as a hard disk, input devices such as a key board and a mouse, and an output device such as a display. As illustrated in FIG. 2, the synthetic aperture processing system 10 including the measurement parameter input unit 11, the signal transmission unit 12, the signal reception unit 14, the range compression unit 15, the model data calculation unit 16, the sample data selection unit 17, cross-correlation computation unit 18, and the image output unit 19 operates by predetermined computer software read through hardware such as the CPU and the RAM, the software driving the transmission modules, the input devices, and the output devices under the control of the CPU and reading and writing data on the RAM and the auxiliary storage device. Based on the function block diagram illustrated in FIG. 2, each function block is described below.

The measurement parameter input unit 11 is a unit for input of various measurement parameters. The measurement parameters may be loaded, for example, through input by an operator or readout of storage data from a storage device. Specific examples of the measurement parameters include the travel speed of the platform, the output interval of chirp waves, the transmission speed of chirp waves, the number of data segments for the synthetic aperture process in the azimuth direction, the reception sampling frequency, and the rate of transmission chirp. These data sets of the measurement parameters are transmitted to the signal transmission unit 12, the signal reception unit 14, and the model data calculation unit 16.

The signal transmission unit 12 generates frequency-modulated waves (chirp waves) having time-varying frequencies and radiating the frequency-modulated waves to the irradiation region from a plurality of measuring sites. The signal transmission unit 12 produces chirp waves in accordance with some parameters such as the transmission speed of chirp waves among various parameters received from the measurement parameter input unit 11 and then radiates chirp waves from the antennas 13 at a plurality of positions in the azimuth direction in accordance with the parameters such as the travel speed of the platform and the output intervals of chirp waves.

Figure 3:
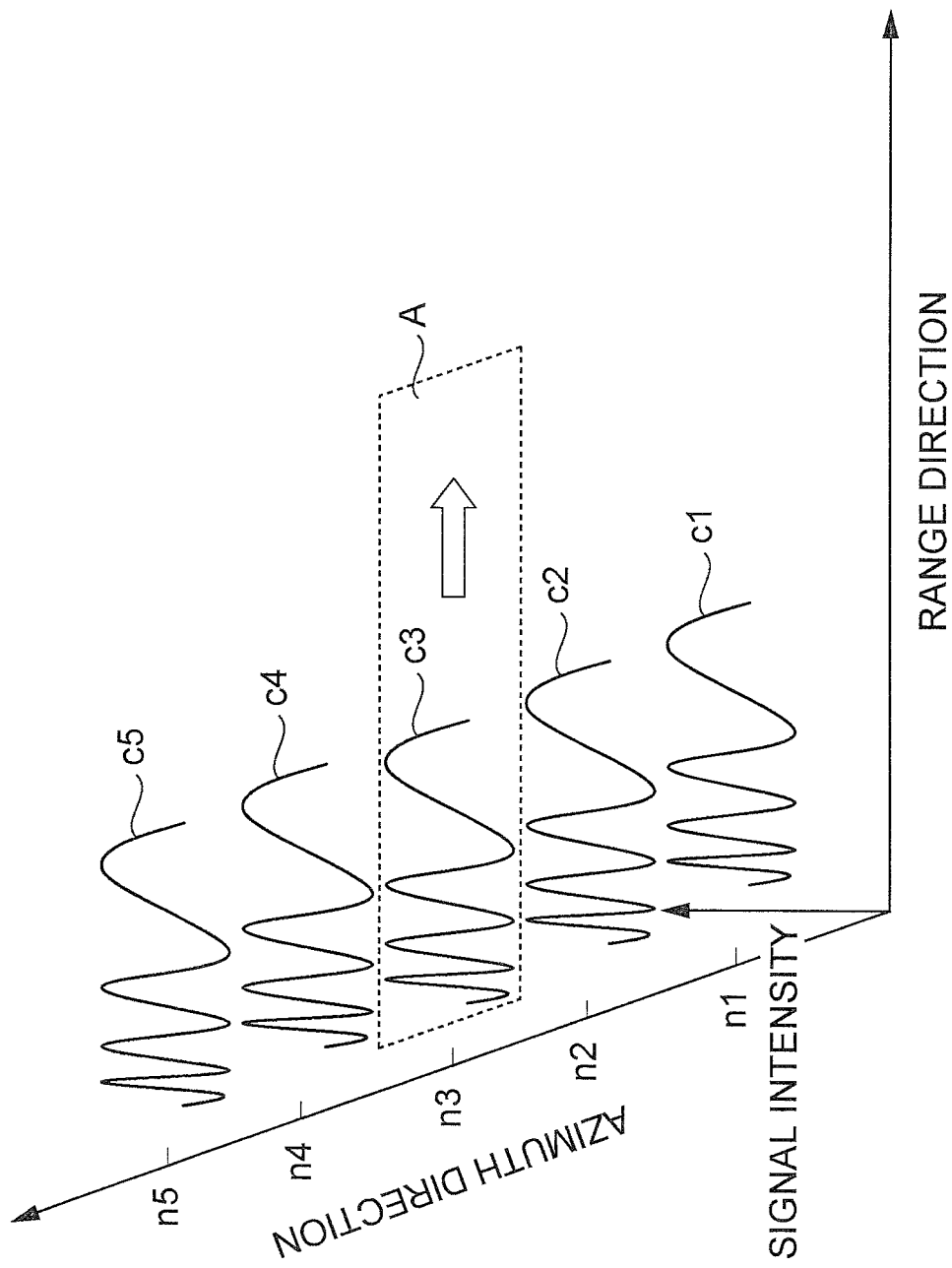
FIG. 3 is an example of chirp waves used in the present embodiment.

In the present embodiment, as illustrated in FIG. 3, a set of five points n1 to n5 at equal intervals along the azimuth direction is subjected to the synthetic aperture process. As illustrated in FIG. 3, the chirp waves c1 to c5 are radiated in the range direction (right direction in FIG. 3) from these five points at equal intervals n1 to n5 in the azimuth direction, respectively. As having been described with reference to FIG. 1, in the synthetic aperture process, the common area 5 of the irradiation regions $3a$ to $3c$ at a plurality of positions in the azimuth direction is an object to be detected, and, therefore, in the case of the present embodiment, the synthetic aperture process of the set of five points n1 to n5 in FIG. 3 can detects the region A, which is in the range direction from the position n3, i.e., the center of the positions n1 to n5.

The signal reception unit 14 receives a plurality of reflected waves caused by the plurality of chirp waves radiated from the signal transmission unit 12. In accordance with some parameters such as the reception sampling frequency among various parameters received from the measurement parameter input unit 11, the signal reception unit 14 executes processing steps of filtering, amplification, and digitalization of the received reflected waves, and transmits them to the range compression unit 15.

Figure 4:
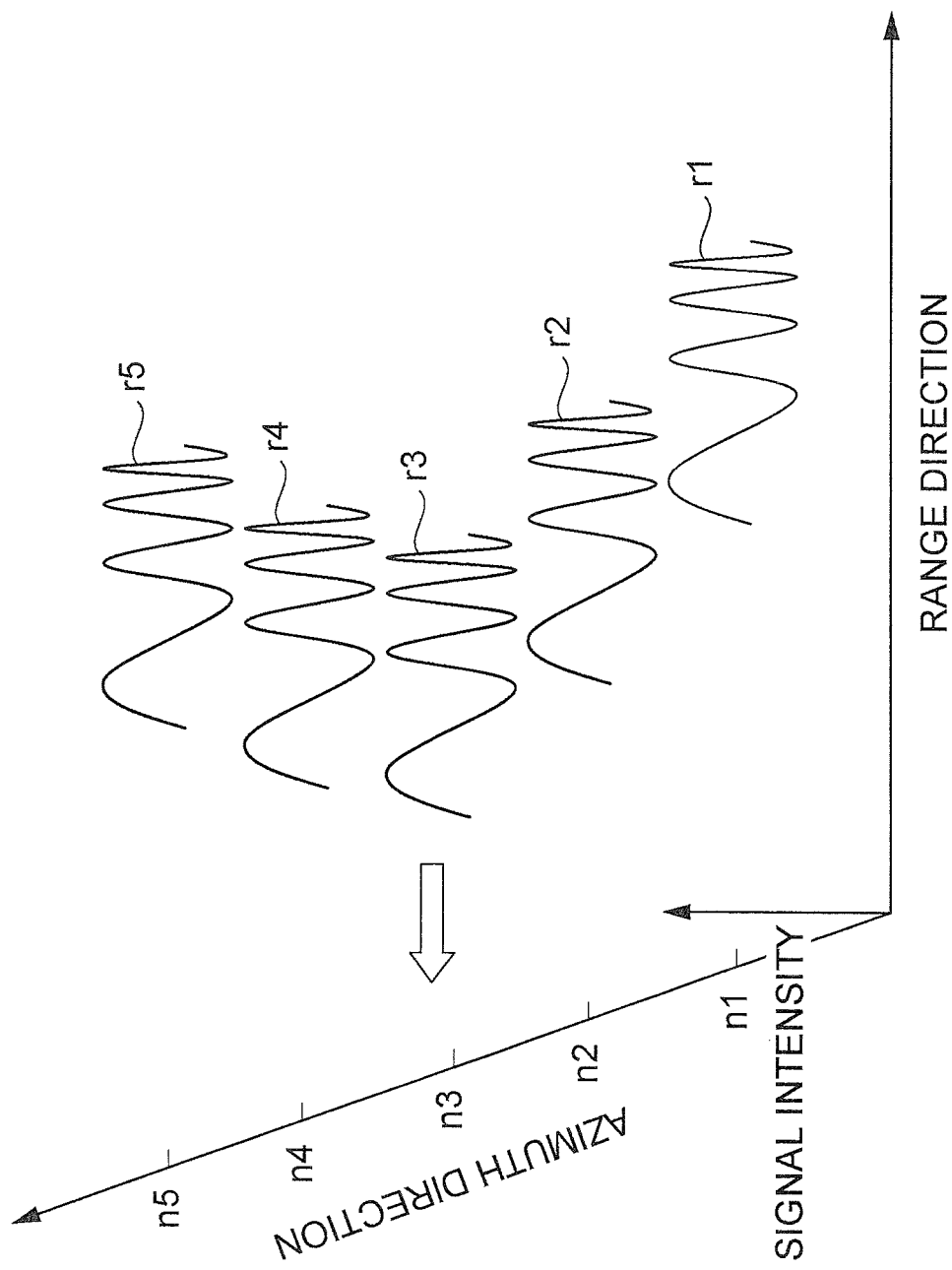
FIG. 4 is an example of reflected waves used in the present embodiment.

FIG. 4 illustrates exemplary reflected waves r1 to r5 corresponding to the chirp waves c1 to c5, respectively, exemplified in FIG. 3. FIG. 4 illustrates the reflected waves r1 to r5, that are produced by reflection of the chirp waves c1 to c5, respectively, by an object (including one on the seafloor surface) present in the range direction from the position n3 of the azimuth direction and that are received by the signal reception unit 14. The signal reception unit 14 acquires data of reflected waves as data on a predetermined coordinate system. Specifically, the reflected waves r1 to r5 are converted to a data column including the position coordinate data in the range and azimuth directions and signal intensities.

The interval in the data column in the range direction is determined by the parameters such as the reception sampling frequency set by the measurement parameter input unit 11. The position coordinates of reflected waves r1 to r5 in the azimuth direction correspond to the irradiation sites n1 to n5 of the chirp waves c1 to c5, respectively. The position coordinates of the reflected waves r1 to r5 in the range direction are determined by the signal reception unit 14 in accordance with the elapsed times from the transmission of the chirp waves c1 to c5 to the reception of the reflected waves r1 to r5. The position coordinate of the reflected wave approaches the irradiation site as the elapsed time and the distance from the measuring sites to the object decrease. As illustrated in FIG. 4, the reflected wave r3 at the position n3, which has the shortest distance from the measuring site to the object, is placed closest to the irradiation site, the reflected waves r2 and r4 at the positions n2 and n4 are placed farther from the irradiation site than the reflected waves r3, and the reflective waves r1 and r5 at the positions n1 and n5 are placed even farther from the irradiation site.

Figure 5:
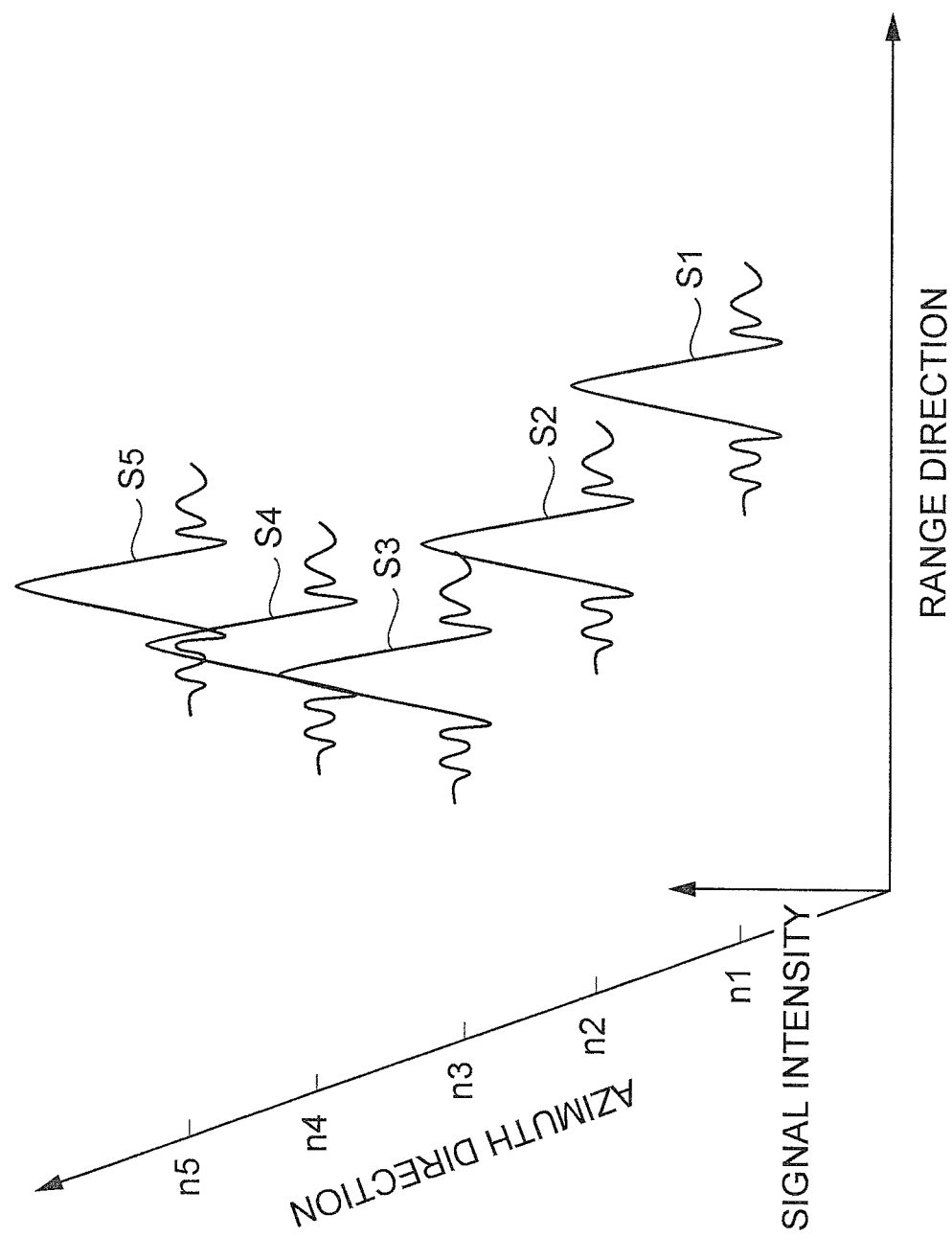
FIG. 5 is an example of reception data generated by a range compression unit.

The range compression unit 15 range-compresses each of the plurality of reflected waves r1 to r5 received by the signal reception unit 14 to generate reception data consisting of a plurality of sinc functions s1 to s5. Specifically, the range compression unit 15 compresses the reflected waves r1 to r5 along the range direction by any conventional pulse compression technique such as an autocorrelation computation and converts them into sinc function-like reception data with a smaller number of data segments. FIG. 5 illustrates the waveforms s1 to s5 of the reception data after the reflected waves in FIG. 4 were range-compressed. As illustrated in FIG. 5, the reception data are converted into sinc function-like waveforms s1 to s5 reflecting the elapsed times of reflected waves r1 to r5 in FIG. 4. These sinc function-like waveforms s1 to s5, like the reflective wave r1 to r5, are each a data column including the position coordinates in the range and azimuth direction and the signal intensity. The generated reception data is transmitted to the sample data selection unit 17.

Figure 6:
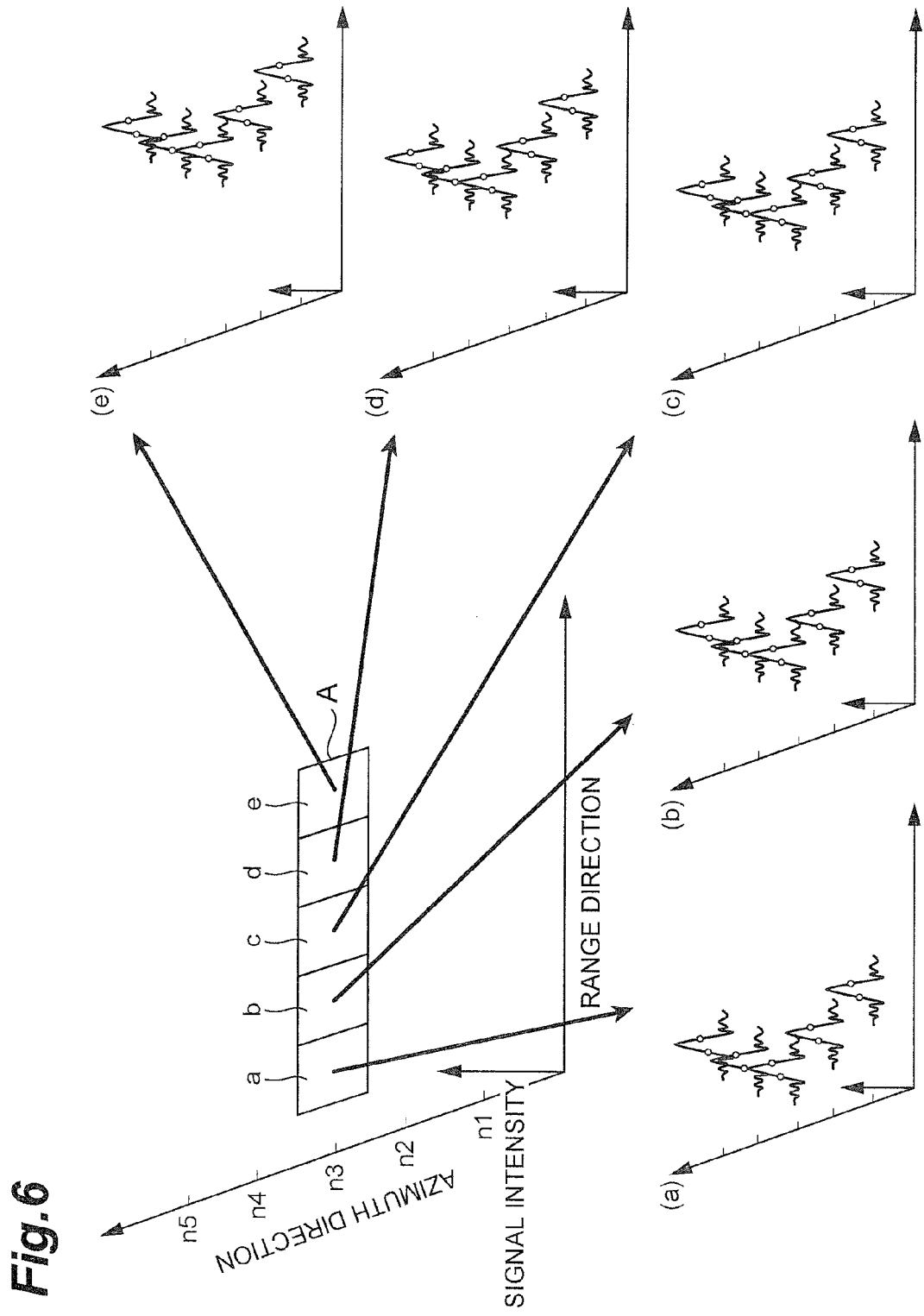
FIG. 6 is an example of a plurality of model data segments calculated by a model data calculation unit.

The model data calculation unit 16 calculates model data consisting of a plurality of sinc functions, which are obtained by range-compressing ideal reception waves caused by the reflection of the chirp signals at a plurality of predetermined positions in the irradiation region, for each of the predetermined positions in the irradiation region. "A plurality of predetermined positions in the irradiation region" refers to the positions to be detected by the synthetic aperture process, and in the present embodiment, as illustrated in FIG. 6, it refers to the regions a to e which are fifths of the region A to be detected in the range direction from the position n3 which is the center of a set of positions n1 to n5 in the azimuth direction in the synthetic aperture process. That is, model data is calculated for each of the regions a to e. The "ideal reception waves" refers to chirp waves which are assumed to be unscattered or undeflected after they are reflected by objects. These measuring sites and reception waves are determined in accordance with various measurement parameters received from the measurement parameter input unit 11.

In the calculation of model data, assuming that, in each of regions a to e, an object is present in a position apart from the measuring position n3 in the range direction at a distance which can be calculated in accordance with the position coordinate of the each region in the range direction, the elapsed times for the chirp waves c1 to c5 that travel from the positions n1 to n5, reflect on the object and travel back to the original position are calculated, respectively. Based on these elapsed times, position coordinates in the range direction are determined, and the reversed waves c1 to c5 are each placed as reflected waves on the position coordinate system. Specifically, these reflected waves are a data column processed in the same manner as the reflective waves r1 to r5 which are received by the signal reception unit 14 in accordance with, for example, the reception sampling frequency among various measurement parameters received from the measurement parameter input unit 11. The data column includes the position coordinates in the range and azimuth direction and signal intensities, and the intervals of the data column in the range direction are the same as those of the reflective wave r1 to r5 received by the signal reception unit 14.

Subsequently, these reflected waves are converted into five sinc function-like waveforms by the range compression. These sinc function-like waveforms are each a data column including the position coordinates in the range and azimuth direction and the signal intensity, like the waveforms s1 to s5 generated by the range compression unit 15.

Subsequently, two data segments are extracted from each of these five data columns having sinc function-like waveforms to generate a model data segment consisting of ten data segments in total. As illustrated in FIG. 5 and FIG. 6, the sinc functions each have a single pulse peak. Two points having the same distance as the pulse width are extracted on both sides of the pulse peak from each sinc function-like data column. Specifically, two adjacent points where the sum of the signal strengths is the highest are extracted. In the present embodiment, in order to extract two points having the same distance as the pulse width, the measurement parameter input unit 11 preliminarily adjusts the reception sampling frequency and the rate of the transmission chirp.

Thus, the model data segments (a) to (e) corresponding to five regions a to e, respectively, in the range direction at the position n3 in the azimuth direction are calculated. FIG. 6 illustrates an example of the model data segments (a) to (e). As illustrated in FIG. 6, model data segments (a) to (e) are placed in different positions in the range direction in accordance with the corresponding regions a to e in the range direction. The calculated model data segments (a) to (e) are transmitted to the sample data selection unit 17 and the cross-correlation computation unit 18.

The sample data selection unit 17 selects data sets at two points as sample data from each of sinc functions s1 to s5 constituting the reception data for each of the model data segments (a) to (e) calculated by the model data calculation unit 16 in accordance with the position information of the data sets at two points for each sinc function constituting the model data segment. The sample data selection unit 17 selects data segments at ten points from the reception data calculated by the range compression unit 15 in accordance with the data placement in the range direction of each model data segments (a) to (e).

Figure 7:
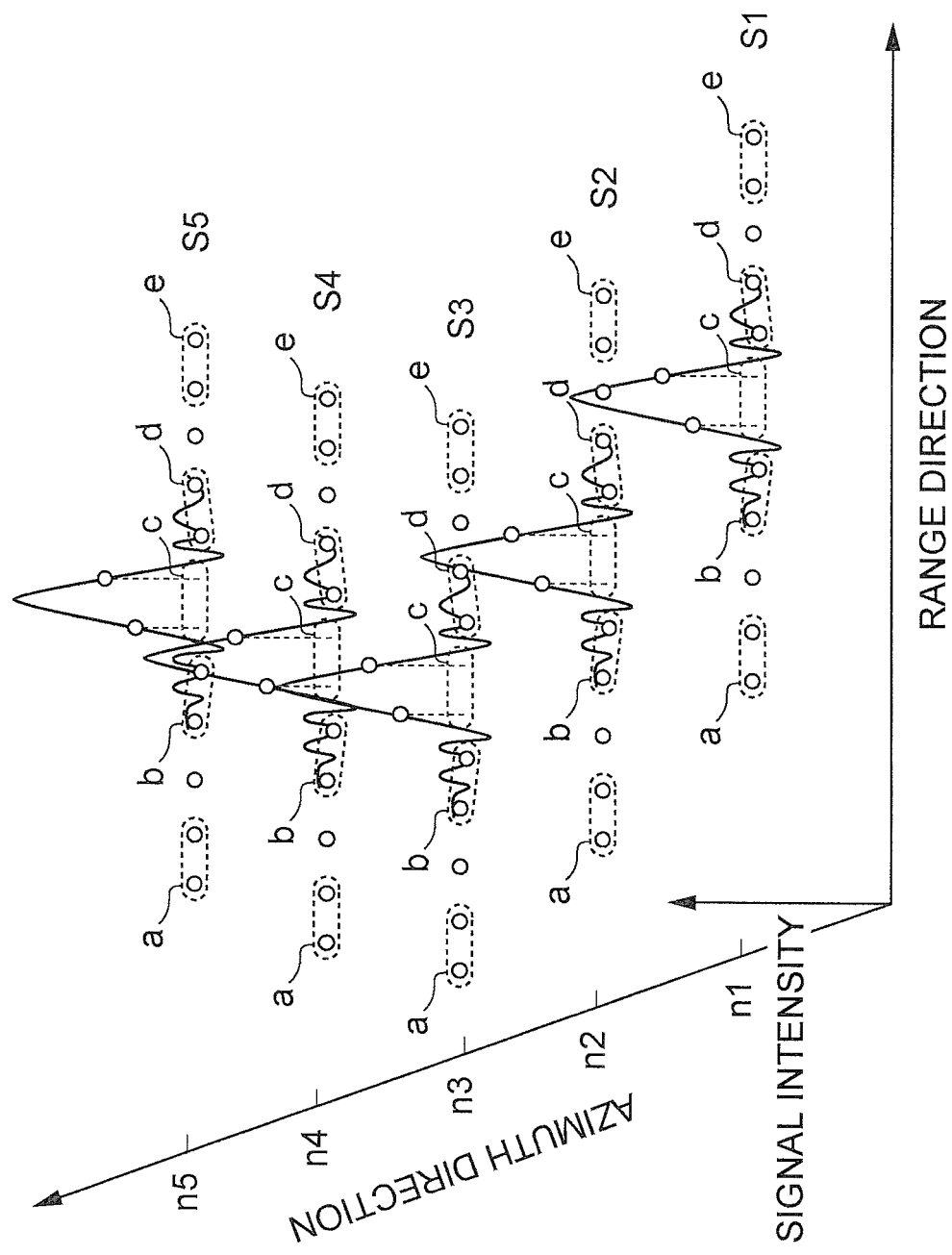
FIG. 7 is exemplary sample data extracted from reception data for each model data segment by a sample data selection unit.

FIG. 7 illustrates exemplary sample data selected in accordance with the model data segments (a) to (e). The areas a to e surrounded by dotted lines in FIG. 7 indicate model data segments (a) to (e) illustrated in FIG. 6 in the range direction at the azimuth position n1 to n5. Data sets at two points included in the regions a to e are selected corresponding to the model data segments (a) to (e) for each of the sinc functions s1 to s5 of the reception data. Then, data segments selected at positions n1 to n5 in the azimuth direction are summed up into 10-point data sets for the regions a to e, respectively, and each 10-point data set for each model data segment is selected as sample data. The selected sample data is transmitted to the cross-correlation computation unit 18.

The cross-correlation computation unit 18 performs the cross-correlation computation between the sample data segments of the reception data selected by the sample data selection unit 17 and a data set of the model data segments calculated by the model data calculation unit 16 to calculate the correlation values.

Specifically, one model segment is selected from the model segments (a) to (e) and a data column is generated for each selected model data segment such that a data segment closer to the original point at the position n1 is placed at the first position, the other one at the second position; a data segment closer to the original point at the position n5 at the ninth position, and the other one at the tenth position, for example. Similarly, a data column is also generated for sample data such that a data segment closer to the original point at the position n1 is placed at the first position, the other one at the second position, a data segment closer to the original point at the position n5 at the ninth position, and the other one at the tenth position. Then, the data columns of the model data segments and the sample data are subjected to the cross-correlation computation. Specifically, signal intensities of the data segments having the same order number are multiplied each other, and the multiplied values are summed to calculate a correlation value. Such a process is applied to all of the model data segments (a) to (e). In the present embodiment, as illustrated in FIG. 8, five correlation values corresponding to regions a to e in FIG. 6 are calculated.

Figure 8:
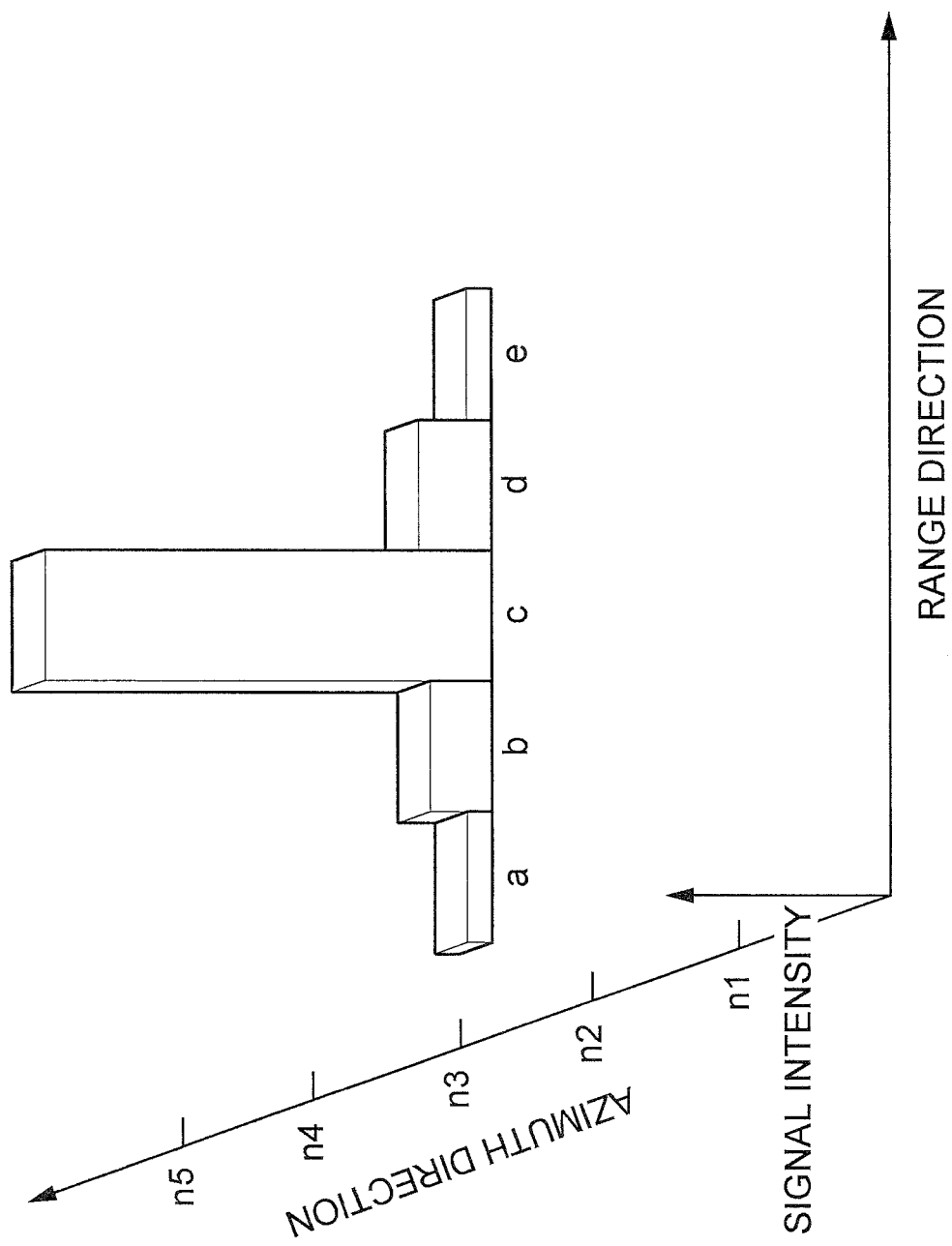
FIG. 8 is exemplary correlation values calculated by a cross-correlation computation unit.

FIG. 8 illustrates exemplary correlation values regarding the regions a to e divided in the range direction at the azimuth position n3 illustrated in FIG. 6. The symbols a to e in FIG. 8 represent the correlation values at the regions a to e in FIG. 6, respectively. These correlation values a to e represent a degree of correlation between the model data segments and the sample data segments, and the value increases as the signal intensities of these data segments are closer each other. A large correlation value between a model data segment and a sample data segment indicates a high probability of an object actually present at the corresponding region of this model data segment. In an example in FIG. 8, the highest value of the region c indicates the highest probability of an object present in the region c.

The image output unit 19 outputs a sonar image based on the correlation values calculated by the cross-correlation computation unit 18. Specifically, as described above, the calculation of the correlation values in the range direction at any position in the azimuth direction using reception data of the positions including the two adjacent positions was repeated one by one, in the azimuth direction to acquire the correlation value of each position in the azimuth direction. Then, these correlation values are aligned along the azimuth direction to arrange the correlation values two-dimensionally in the azimuth direction and range direction. Colors are assigned in accordance with the correlation values. For example, in the case of black and white gradation, the whiter color is assigned to the highest correlation value. The image output unit 19 generates a sonar image based on such assigned color information.

Figure 9:
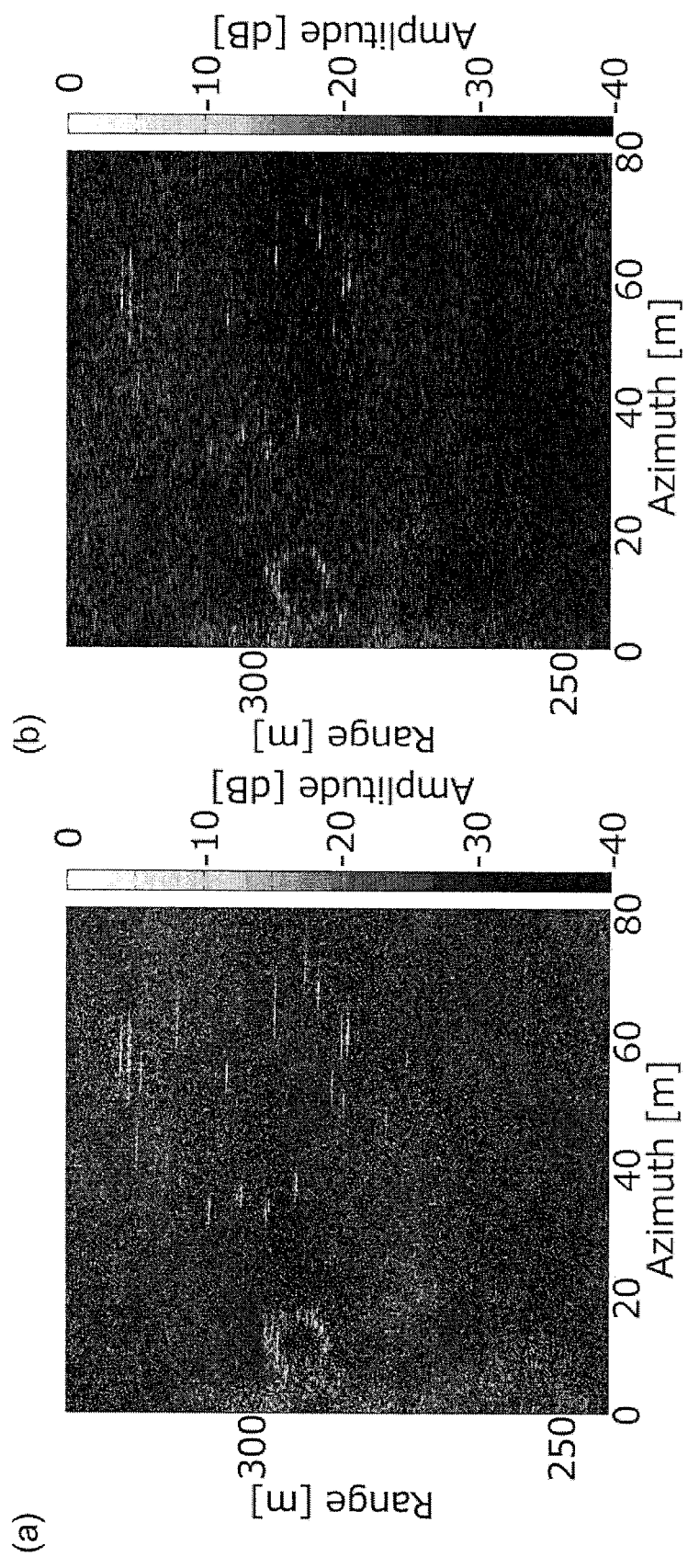
FIG. 9 is a typical sonar image (a) by a conventional sonar, and a typical sonar image (b) outputted from an image output unit.

FIG. 9 is a typical sonar image (a) obtained by a conventional sonar 1, and a typical sonar image (b) output by the technique of the present embodiment. In FIG. 9, the horizontal axes of sonar images (a) and (b) each denote the position coordinate in the azimuth direction, and the vertical axes each denote the position coordinate in the range direction. In FIG. 9(b), the correlation values in FIG. 8 calculated by the cross-correlation computation unit 19 are aligned in the longitudinal direction while a plurality of correlation values are aligned in the azimuth direction along the horizontal axis, representing a two-dimensional arrangement. The sonar image (b) output by the technique of the present embodiment exhibits improved sharpness and contrast compared to the sonar image (a) by the conventional sonar 1, resulting in improved resolution of the sonar image.

Figure 10:
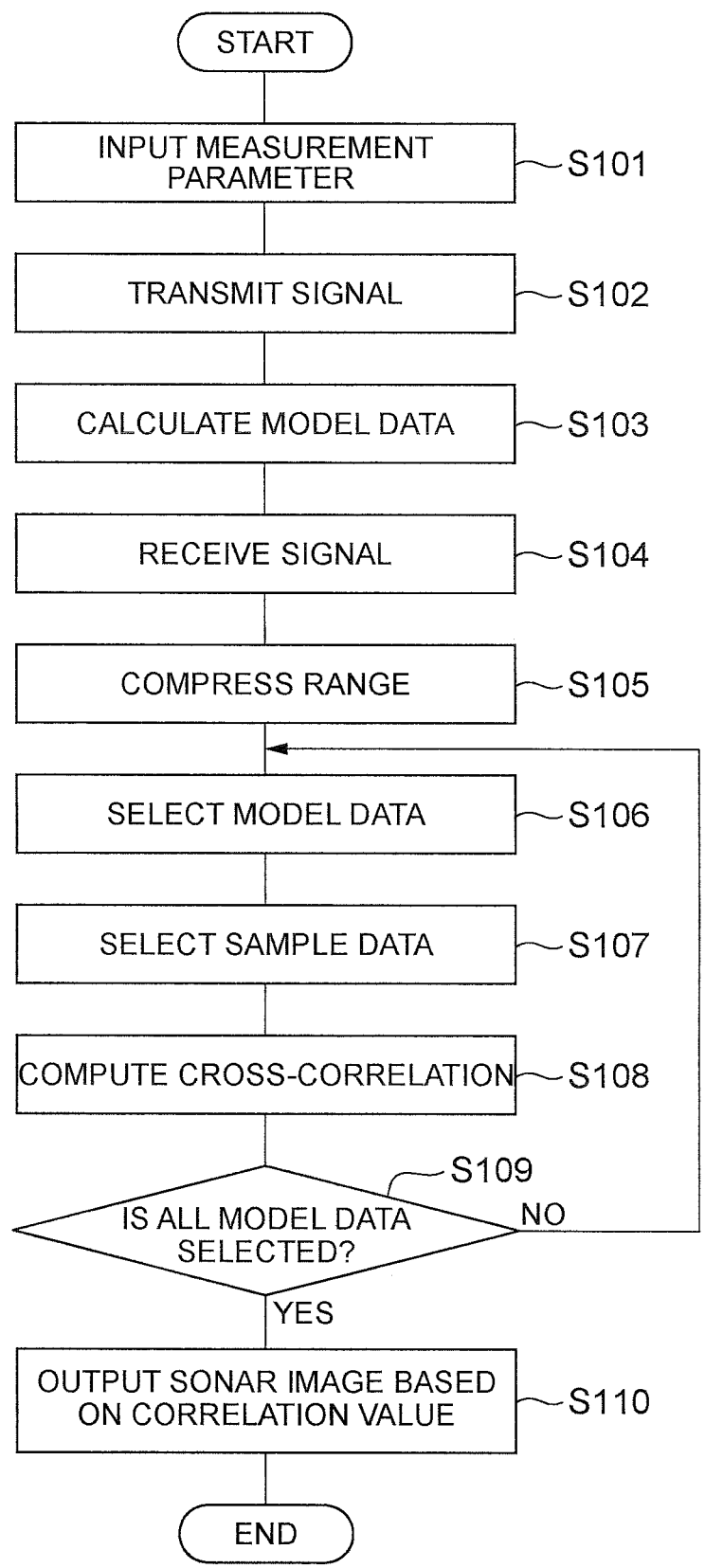
FIG. 10 is a flowchart illustrating a process of a synthetic aperture processing system.

The process of the synthetic aperture processing system 10 of the present embodiment will now be described with reference to the flowchart in FIG. 10.

The measurement parameter unit 11 receives various measurement parameters (S101) and the received measurement parameters are transmitted to the signal transmission unit 12 and the model data calculation unit 16.

The signal transmission unit 12 generates chirp waves in accordance with the measurement parameters and the chirp waves are radiated from the antenna 13 at a predetermined timing (S102: transmission step). Similarly, in accordance with the measurement parameters, the model data calculation unit 16 calculates a model data segment, caused by the reflection of the chirp signals at a plurality of predetermined sites within the irradiation region, for each of the predetermined sites (S103).

Subsequently, the signal reception unit 14 receives the reflected waves caused by the radiated chirp waves (S104: reception step), the range compression unit 15 range-compresses each of the reflective waves to generate reception data consisting of the sinc functions (S105: range compression step).

Then, the sample data selection unit 17 selects one model data segment among the model data segments (S106), selects data sets at two points among each sinc function constituting reception data in accordance with the selected model data segment, and selects a data set of ten points in total as sample data among the reception data (S107).

Then, the cross-correlation computation unit 18 performs the cross-correlation computation between the model segment selected in step S106 and the sample data segment selected in step S107 to calculate the correlation value (S108: correlation value calculation step).

Subsequently, the sample data selection unit 17 checks whether all the model data segments calculated in step S103 are already selected (S109). If unselected model data segments still remain, the process returns to step S106 to repeat the processes of steps S106 to S108. If all the model data segments are selected, the process proceeds to step S110.

If step S109 determines that all the data segments are selected, the image output unit 19 outputs a sonar image based on the correlation values (S110: output step).

The processes of steps S106 to S109, selecting a model data segment and calculating the correlation value successively may be replaced with selecting the sample data segments related to all the model data segments to perform the cross-correlation computation between them at a time. The model data calculation step (S103) may interpose anywhere between the measurement parameter input step (S101) and the mode data selection step (S106).

As describe above, in the synthetic aperture processing system 10 of the present embodiment, the range compression unit 15 performs the range-compression, so that the cross-correlation computation unit 18 can calculate the correlation values using reception data consisting of sinc functions having a smaller number of data segments than the reflected waves, resulting in a reduction in computation load. Furthermore, like conventional two dimensional algorithm, the calculation of the correlation values between the reception data and the model data segments by the cross-correlation computation unit 18 allows the range coverture modification of the conventional algorithm to be unnecessary, resulting in avoidance of large error.

Figure 11:
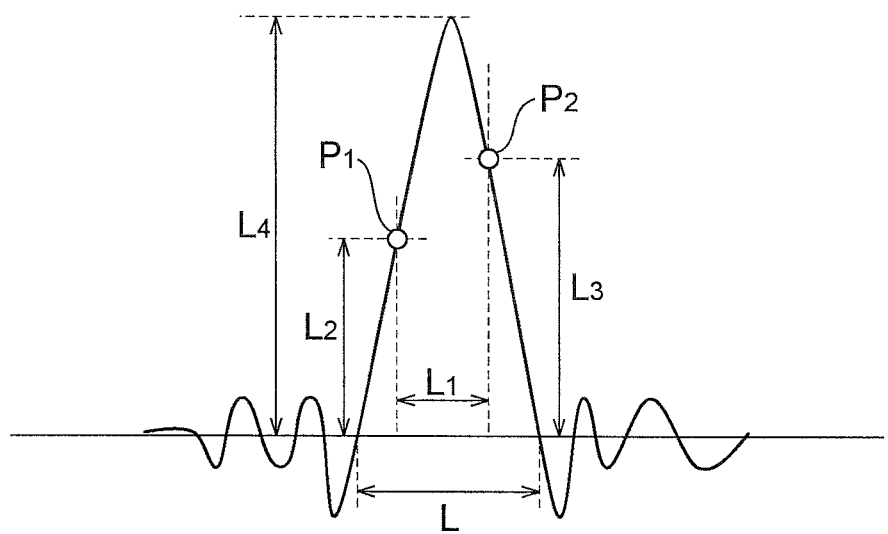
FIG. 11 is a diagram illustrating two points selected on a sinc function-like waveform and the relationship with the pulse peak of the waveform.

In the synthetic aperture processing system 10 of the present embodiment, the model data calculation unit 16 generates a similar waveform as that of the reception data with a sinc function-like waveform generated by the range compression unit 15 and extracts two points having the same distance as the pulse width on both sides of the pulse peak having a sinc function-like waveform to generate model data segments. As illustrated in FIG. 11, these two points P1 and P2 are characterized in that, if the two points P1 and P2 suffice the conditions that "the two points have the pulse peak between them" and "the distance L1 between the two points is equal to the pulse width (L/2)", the sum of the signal strength L2 at the point P1 and the signal strength L3 at the point P2 is always approximately equal to the signal strength L4 (L2+L3≅L4). In the reception data, the data segment at the position of the pulse peak of a sinc function-like waveform may not be included in a data column, depending on the sampling frequency. Conventionally, for the accurate correlation, oversampling and interpolation at the frequency region have been performed before the correlation to create data. Correlating the two points, which have the pulse peak between them and the same distance with the pulse peak, with the sample data (reception data), the synthetic aperture processing system 10 of the present embodiment can obtain the correlation practically equivalent to that using the data at the position of the pulse peak.

Thus, even without closely matching the positions of the pulse peaks of sinc functions including the reception data and model data segments, the correlation between them can be represented, so that no conventional processing for data of the pulse peak positions is required, resulting in a further reduction in computation load. Furthermore, model data segments are generated in accordance with the information of chirp waves in actual use, allowing the synthetic aperture process to be surely implemented.

Second Embodiment

Figure 12:
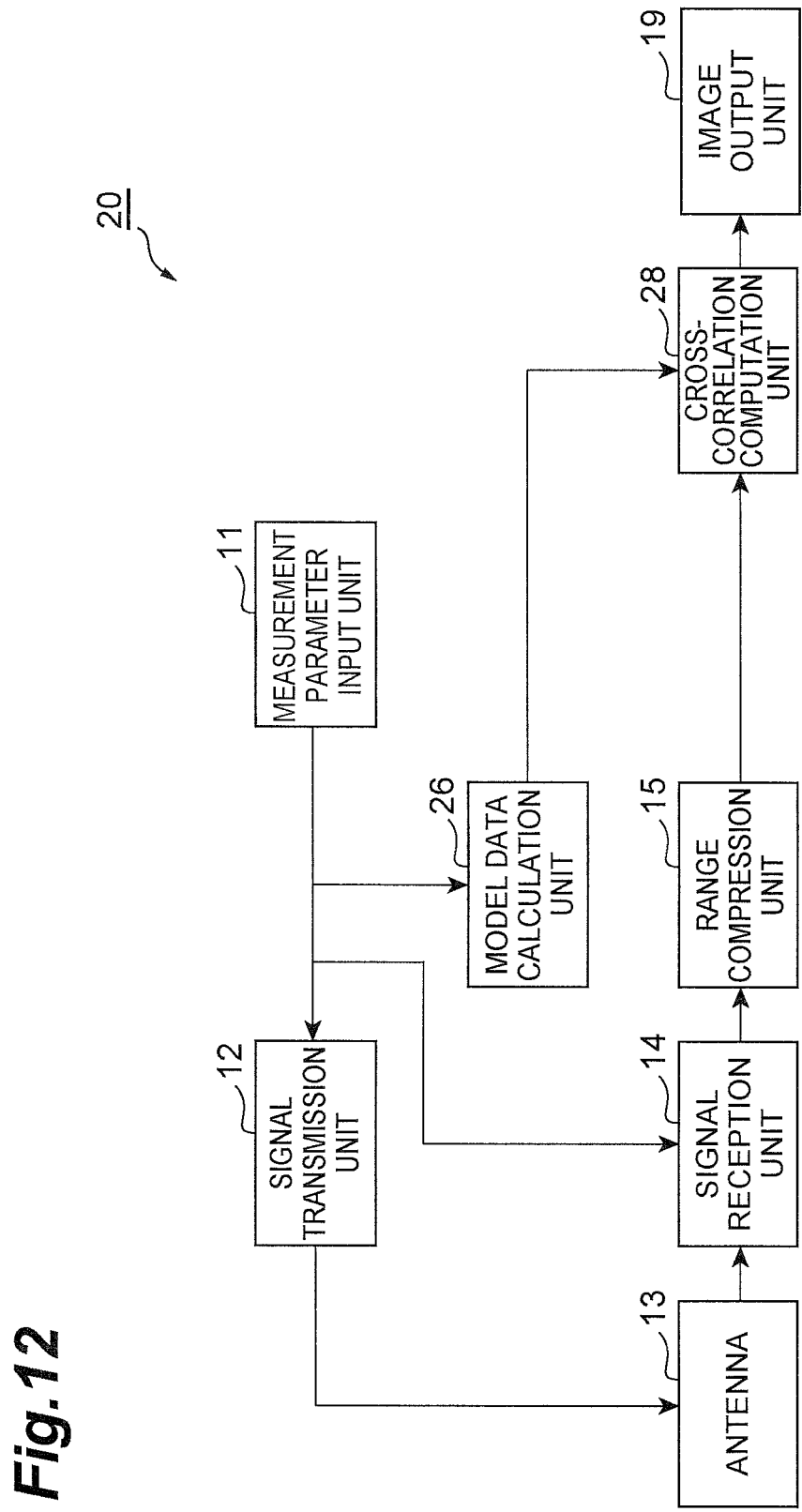
FIG. 12 illustrates a configuration of a synthetic aperture processing system in accordance with a second embodiment of the present invention.

A second embodiment of the synthetic aperture processing system in accordance with the present invention is described below. FIG. 12 illustrates the configuration of the synthetic aperture processing system in accordance with the second embodiment of the present invention. As illustrated in FIG. 12, the synthetic aperture processing system 20 of the present embodiment computes the cross-correlation values with model data using all the reception data without extracting the sample data from the reception data generated by the range compression unit 15, unlike the synthetic aperture processing system 10 in FIG. 2.

In the synthetic aperture processing system 20, the function blocks of the measurement parameter input unit 11, the signal transmission unit 12, the signal reception unit 14, the range compression unit 15, and the image output unit 19 are the same as those of the units in the synthetic aperture processing system 10 in FIG. 2.

A model data calculation unit 26 performs the same process as the model data calculation unit 16 in FIG. 2, until the step of generating five sinc function-like waveforms in each of the regions a to e which are fifths of the region A to be detected in the range direction from the position n3 illustrated in FIG. 6. Subsequently, the model data calculation unit 26 sums up data columns of five sinc function-like waveforms to calculate one model data segment without selecting two points on both sides of the pulse peak from each sinc function-like data column. Consequently, the number of model data segments calculated by the model data calculation unit 26 is larger than that (ten points) calculated by the model data calculation unit 16. The calculated model data segments are transmitted to a cross-correlation computation unit 28.

The cross-correlation computation unit 28 performs the cross-correlation computation between the reception data generated by the range compression unit 15 and the plurality of model data segments calculated by the model data calculation unit 26 to calculate the correlation values.

In accordance with the synthetic aperture processing system 20 of the present embodiment, the signal transmission unit 12 generates chirp waves to be radiated to an irradiation region from a plurality of measuring sites, while the signal reception unit 14 receives a plurality of reflected waves caused by the plurality of radiated chirp waves. The range compression unit 15 range-compresses each of the received reflected waves to generate reception data consisting of a plurality of sinc functions. The model data calculation unit 26 calculates a plurality of model data segments consisting of a plurality of sinc functions, which are obtained by range-compression of ideal reception waves caused by the reflection of the chirp waves at a plurality of predetermined positions in the irradiation region. The cross-correlation computation unit 28 performs the cross-correlation computation between the reception data generated by the range compression unit 15 and a data set of the model data segments to calculate the correlation values. The image output unit 19 outputs the correlation value calculated by cross-correlation computation unit 18.

These configurations performs the range-compression to calculate the correlation values using reception data consisting of sinc functions with a smaller number of data segments than the reflected waves, resulting in a reduction in computation load. Furthermore, like the conventional two dimensional algorithm, the calculation of the correlation values between the reception data and the model data segments allows the range coverture modification of the conventional algorithm to be unnecessary, resulting in avoidance of the large error. Model data segments are generated in response to the information of the chirp waves in actual use, resulting in the synthetic aperture process to be surely implemented.

Third Embodiment

Figure 13:
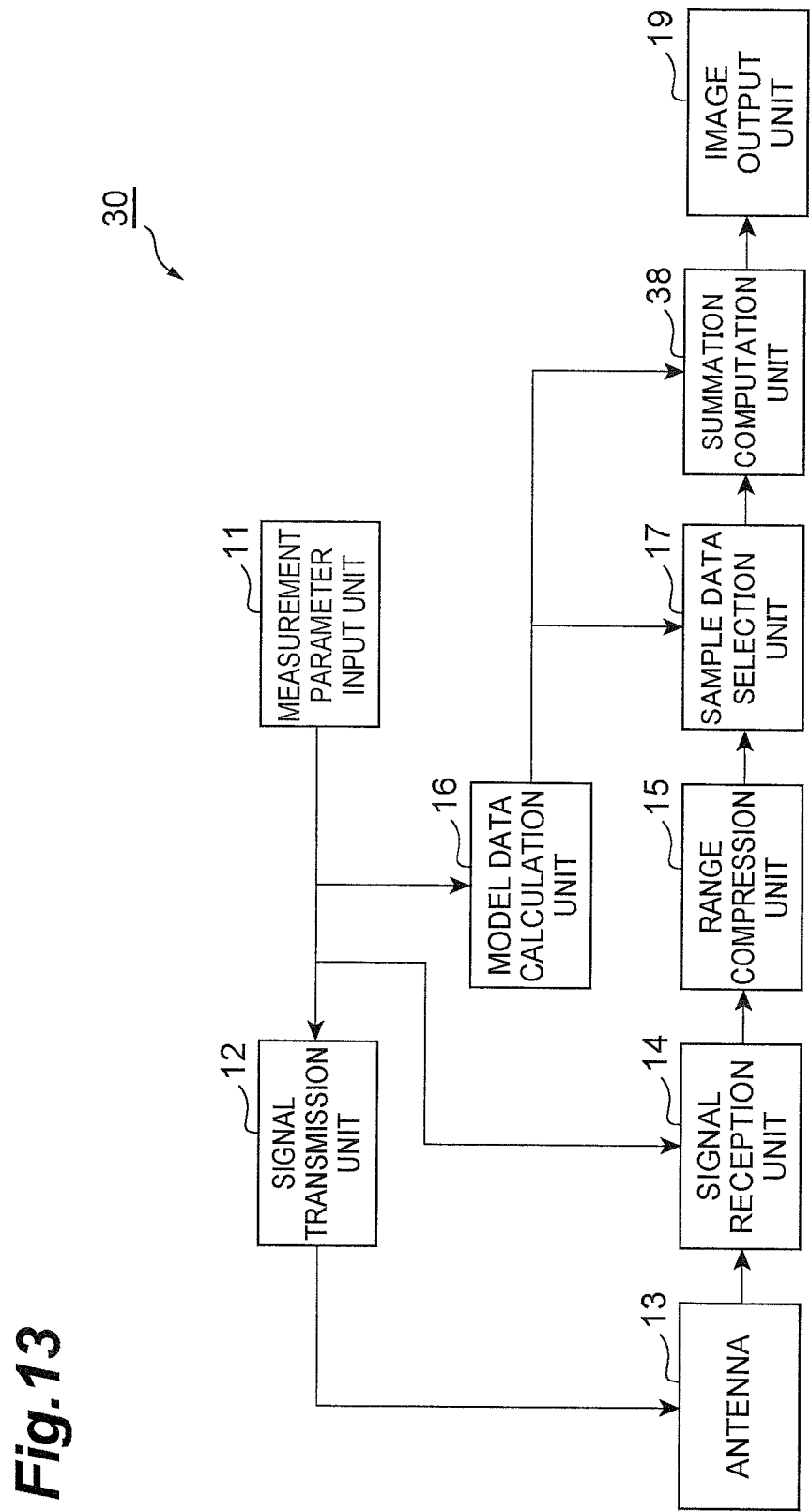
FIG. 13 illustrates a configuration of a synthetic aperture processing system in accordance with a third embodiment of the present invention.

A third embodiment of the synthetic aperture processing system in accordance with the present invention is described below. FIG. 13 illustrates the configuration of the synthetic aperture processing system in accordance with the third embodiment of the present invention. As illustrated in FIG. 13, the synthetic aperture processing system 30 of the present embodiment does not perform the cross-correlation computation between the sample data segments selected by the sample data selection unit 17 and the model data segments, but performs simple summation computation to calculate the correlation values, unlike the synthetic aperture processing system 10 in FIG. 2.

In the synthetic aperture processing system 30, the function blocks of the measurement parameter input unit 11, the signal transmission unit 12, the antenna 13, the signal reception unit 14, the range compression unit 15, the model data calculation unit 16 and the image output unit 19 are the same as those of the units in the synthetic aperture processing system 10 in FIG. 2.

A summation computation unit 38 performs the summation computation of the sample data segments of reception data selected by the sample data selection unit 17 to compute the correlation values. Specifically, all the signal intensities of each data segments of sample data are summed up to calculate the correlation values.

In accordance with the synthetic aperture processing system 30 of the present embodiment, the signal transmission unit 12 generates chirp waves and the chirp waves are radiated to an irradiation region from a plurality of measuring sites, while the signal reception unit 14 receives a plurality of reflected waves caused by the plurality of radiated chirp waves. The range compression unit 15 range-compresses each of the received reflected waves to generate reception data consisting of a plurality of sinc functions. The model data calculation unit 16 calculates a plurality of model data segments consisting of a plurality of sinc functions obtained by range-compression of ideal reception waves caused by the reflection of the chirp waves at a plurality of predetermined positions in the irradiation region. The model data calculation unit 16 extracts two points having a predetermined distance on both sides of the peak from each sinc function constituting model data to calculate model data using these extracted data sets. Then the sample data selection unit 17 selects data sets at two points as sample data from each of sinc functions constituting the reception data for each of the model data segments calculated by the model data calculation unit 16 in accordance with the position information of the data sets at two points for each sinc function constituting the model data segments. The summation computation unit 38 performs the summation computation of the sample data segments of reception data selected by the sample data selection unit 17 to compute the correlation values. The image output unit 19 outputs the correlation values calculated by the cross-correlation computation unit 18.

These configurations performs the range-compression to calculate the correlation values using reception data consisting of sinc functions with a smaller number of data segments than the reflected waves, resulting in a reduction in computation load. Furthermore, like the conventional two dimensional algorithm, the calculation of the correlation values between the reception data and the model data segments allows the range coverture modification of the one-dimensional conventional algorithm to be unnecessary, resulting in avoidance of the large error. Sample data are extracted from reception data to perform the cross-correlation computation, resulting in a further reduction in amount of data and computation load for calculating correlation values. Furthermore, only summation computation using these data segments after extracting sample data compute correlation values, resulting in an even further reduction in computation load. Furthermore, model data segments are generated in response to the chirp waves in actual use, allowing the synthetic aperture process to be surely implemented.

The present invention is not limited to the above embodiments, but various modifications may be made. For example, the number of the positions in the azimuth direction for the synthetic aperture process may be other than five shown in the above embodiments. Furthermore, in the above embodiments, the model data calculation units 16 and 26 generate model data segments in accordance with various measurement parameters input by the measurement parameter input unit 11, but also model data segments stored preliminary in storage devices in accordance with various parameters may be selected appropriately in accordance with measurement parameters.

Although a synthetic aperture sonar has been described in the above embodiments, the present invention may be applied to synthetic aperture radars. Furthermore, the present invention may be applied to a conventional pulse compression process with no synthetic aperture process.

The invention claimed is:
1. A synthetic aperture processing system comprising;
    transmission means for generating a frequency-modulated wave having a time-varying frequency and radiating the frequency-modulated wave to an irradiation region from a plurality of measuring sites;
    reception means for receiving a plurality of reflected waves caused by the plurality of frequency-modulated waves radiated from the transmission means and reflected off objects in the irradiation region;
    range compression means for range-compressing each of the reflected waves received by the reception means and generating reception data consisting of a plurality of sinc functions;
    correlation value calculation means for, based on a plurality of model data segments consisting of a plurality of sinc functions obtained by range compression of ideal reception waves caused by the reflection of the frequency-modulated waves at a plurality of predetermined sites in the irradiation region and the reception data generated by the range compression means, calculating correlation values representing a degree of correlation between each of the model data segments and the reception data; and
    output means for outputting the correlation values calculated by the correlation value calculation means.

2. The synthetic aperture processing system according to claim 1, further comprising model data segments calculation means for calculating the model data segments used by the correlation value calculation means, for each of the determined sites in the irradiation region in accordance with the frequency-modulated wave generated by the transmission means.

3. The synthetic aperture processing system according to claim 2, wherein the model data calculation means extracts data sets at two points having a predetermined distance on both sides of the peak from each sinc function constituting the model data segment to calculate the model data segment using the extracted data sets; and
    the correlation value calculation means further comprises:
    selection means for selecting data sets at two points as sample data from each of the sinc functions constituting the reception data for each of the model data segments calculated by the model data calculation means in accordance with the position information of the data sets at two points for each sinc function constituting the model data segments; and
    cross-correlation computation means for performing the cross-correlation computation between sample data of the reception data selected by the selection means and the data sets of the plurality of model data segments to calculate the correlation values.

4. The synthetic aperture processing system according to claim 2, wherein the model data calculation means extracts data sets at two points having a predetermined distance on both sides of the peak from each sinc function constituting the model data segments to calculate the model data segments using the extracted data sets; and
    the correlation value calculation means further comprises:
    sample data selection means for selecting data sets at two points as sample data from each of the sinc functions constituting the reception data for each of the model data segments calculated by the model data calculation means in accordance with the position information of the data sets at two points for each sinc function constituting the model data segments; and summation computation means for performing summation computation of the sample data segments of reception data selected by the sample data selection means to calculate the correlation values.

5. A synthetic aperture processing method comprising:

a transmission step of generating a frequency-modulated wave having a time-varying frequency and radiating the frequency-modulated wave to an irradiation region from a plurality of measuring sites;

a reception step of receiving a plurality of reflected waves caused by the plurality of frequency-modulated waves radiated from the transmission step and reflected off objects in the irradiation region;

a range compression step of range-compressing each of the reflected waves received by the reception step and generating reception data consisting of a plurality of sinc functions;

a correlation value calculation step of, based on a plurality of model data segments consisting of a plurality of sinc functions obtained by range-compression of ideal reception waves caused by the reflection of the frequency-modulated waves at a plurality of predetermined sites in the irradiation region and the reception data generated by the range compression step, calculating correlation values representing a degree of correlation between each of the model data segments and the reception data; and an output step of outputting the correlation values calculated by the correlation value calculation step.

6. A synthetic aperture processing device comprising:

a transmitter configured to generate a frequency-modulated wave having a time-varying frequency and to radiate the frequency-modulated wave to an irradiation region from a plurality of measuring sites;

a receiver configured to receive a plurality of reflected waves caused by the plurality of frequency-modulated waves radiated from the transmitter and reflected off objects in the irradiation region;

a hardware processor configured
  to perform range-compressing on each of the reflected waves received by the receiver and to generate reception data consisting of a plurality of sinc functions, and
  to calculate correlation values, based on a plurality of model data segments consisting of a plurality of sinc functions obtained by range compression of ideal reception waves caused by the reflection of the frequency-modulated waves at a plurality of predetermined sites in the irradiation region and the reception data generated by the range compressing, the correlation values representing a degree of correlation between each of the model data segments and the reception data; and a display device configured to display the correlation values calculated by the hardware processor.

* * * * *